United States Patent [19]

Joseph

[11] Patent Number: 5,503,655
[45] Date of Patent: Apr. 2, 1996

[54] LOW COST TITANIUM PRODUCTION

[75] Inventor: Adrian A. Joseph, Los Angeles, Calif.

[73] Assignee: Orbit Technologies, Inc., Carlsbad, Calif.

[21] Appl. No.: 200,214

[22] Filed: Feb. 23, 1994

[51] Int. Cl.$^6$ .................................................. C22B 9/00
[52] U.S. Cl. .......................... 75/621; 75/10.19; 75/10.64
[58] Field of Search .............................. 75/10.18, 10.19, 75/435, 467, 468, 508, 621, 10.64; 423/83, 69; 204/64 T

[56] References Cited

U.S. PATENT DOCUMENTS

| | | | |
|---|---|---|---|
| 2,727,937 | 12/1955 | Boyer | 373/77 |
| 2,960,331 | 11/1960 | Hanks | 373/10 |
| 2,997,760 | 8/1961 | Hanks | 164/460 |
| 3,116,998 | 1/1964 | Pagonis | 75/10.14 |
| 3,210,454 | 10/1965 | Morley | 373/22 |
| 3,219,435 | 11/1965 | Gruber | 75/10.23 |
| 3,237,254 | 3/1966 | Hanks | 164/469 |
| 3,342,250 | 9/1967 | Treppschuh | 164/469 |
| 3,343,828 | 9/1967 | Hunt | 219/121.16 |
| 3,406,056 | 10/1968 | Albert et al. | 75/10.48 |
| 3,467,167 | 9/1969 | Mahin | 164/473 |
| 3,494,804 | 2/1970 | Hanks | 11/72 |
| 3,546,348 | 12/1970 | DeCorso | 273/82 |
| 3,549,353 | 12/1970 | Sterling | 11/23 |
| 3,607,222 | 9/1971 | Kennedy | 75/10.29 |
| 3,746,535 | 7/1973 | Brandstatter | 75/614 |
| 3,764,297 | 10/1973 | Coad | 75/10.23 |
| 4,027,722 | 6/1977 | Hunt | 164/469 |
| 4,035,574 | 7/1977 | Kennedy | 373/11 |
| 4,456,479 | 6/1984 | Harris et al. | 75/621 |
| 4,460,550 | 7/1984 | Rado | 423/79 |
| 4,482,376 | 11/1984 | Tarasescu | 75/10.64 |
| 4,488,902 | 12/1984 | Hunt | 75/10.20 |
| 4,793,854 | 12/1988 | Shimotori | 75/10.1 |
| 4,823,608 | 5/1989 | McNamara | 73/783 |
| 4,838,340 | 6/1989 | Entrekin | 164/455 |
| 4,932,635 | 6/1990 | Harker | 266/200 |
| 5,147,451 | 9/1992 | Leland | 75/620 |
| 5,160,532 | 11/1992 | Benz et al. | 75/10.24 |
| 5,171,357 | 12/1992 | Aguirre et al. | 75/10.19 |

FOREIGN PATENT DOCUMENTS 549299  11/1957  Canada.
809444  2/1959  United Kingdom.

Primary Examiner—Ngoclan Mai
Attorney, Agent, or Firm—Ladas & Parry

[57] ABSTRACT

A method for refining metal slag containing $TiO_2$ to produce titanium compound comprising introducing molten slag into a heat vacuum chamber, whereby the heat and vacuum oxidize the slag. The slag is skimmed or further reacted by application of heat and vacuum to remove additional impurities.

11 Claims, 1 Drawing Sheet

LOW COST TITANIUM PRODUCTION

FIELD OF THE INVENTION

The present invention relates to the process of refining titanium.

BACKGROUND OF THE PRIOR ART

Numerous inventions for processing and making titanium alloys are present in the art. Descriptions of some of these are found in the below listed patents.

| | |
|---|---|
| U.S. Pat. No. 4793854 | U.S. Pat. No. 3549353 |
| U.S. Pat. No. 3764297 | U.S. Pat. No. 4828608 |
| U.S. Pat. No. 3607222 | U.S. Pat. No. 3546348 |
| U.S. Pat. No. 4488902 | U.S. Pat. No. 3210454 |
| U.S. Pat. No. 3237254 | U.S. Pat. No. 4035574 |
| U.S. Pat. No. 3494804 | U.S. Pat. No. 3467167 |
| U.S. Pat. No. 4027722 | U.S. Pat. No. 3342250 |
| U.S. Pat. No. 2997760 | U.S. Pat. No. 4838340 |
| U.S. Pat. No. 3343828 | U.S. Pat. No. 2727937 |
| Canadian Pat. No. 549299 | British Pat. No. 809444 |

Titanium alloys are important because they are ideally suited for a wide variety of applications in the aerospace, aircraft, military and automotive fields. Titanium combines the attractive properties of high strength and light weight with resistance to corrosion and stability under high temperatures. While titanium is easy to fabricate, there are numerous impediments to its wide-spread use. Refining titanium is energy intensive and involves significant costs in handling due to the need for toxic chemicals for its refining. Further, in refining titanium, there is a high cost involved in disposing of the toxic by-products produced in the refinery process. Finally, there are the geopolitical aspects of having to obtain most of the semi-processed titanium sponge from former communist and communist countries as well as from the Republic of South Africa.

In an attempt to overcome the foregoing problems, the presently described invention has been developed. This invention does not require the use of toxic chemicals nor does it produce toxic waste, and it consumes a relatively low amount of energy. These factors along with others result in a comparatively low capital investment to carry out the present invention particularly in view of the fact that the present invention can be economically scaled down when desired. Other points of note with respect to the present invention are that mini-mills may be located near a source of ore or center of consumption when using the present invention and the present invention uses electrical power to refine the ores and produce metallic titanium, its dioxide or its alloys.

SUMMARY OF THE INVENTION

Disclosed herein is a method for refining slag comprising the steps of:

removing the impurities in said slag through temperature, pressure skimming and reactions.

More specifically, the invention involves subjecting liquid slag containing $TiO_2$ to vacuum and heat to oxidize the impurities therefrom, skimming said slag and reacting said slag to volatile suboxides, wherein the liquid $TiO_2$ may be separated and cooled.

Figure 1:
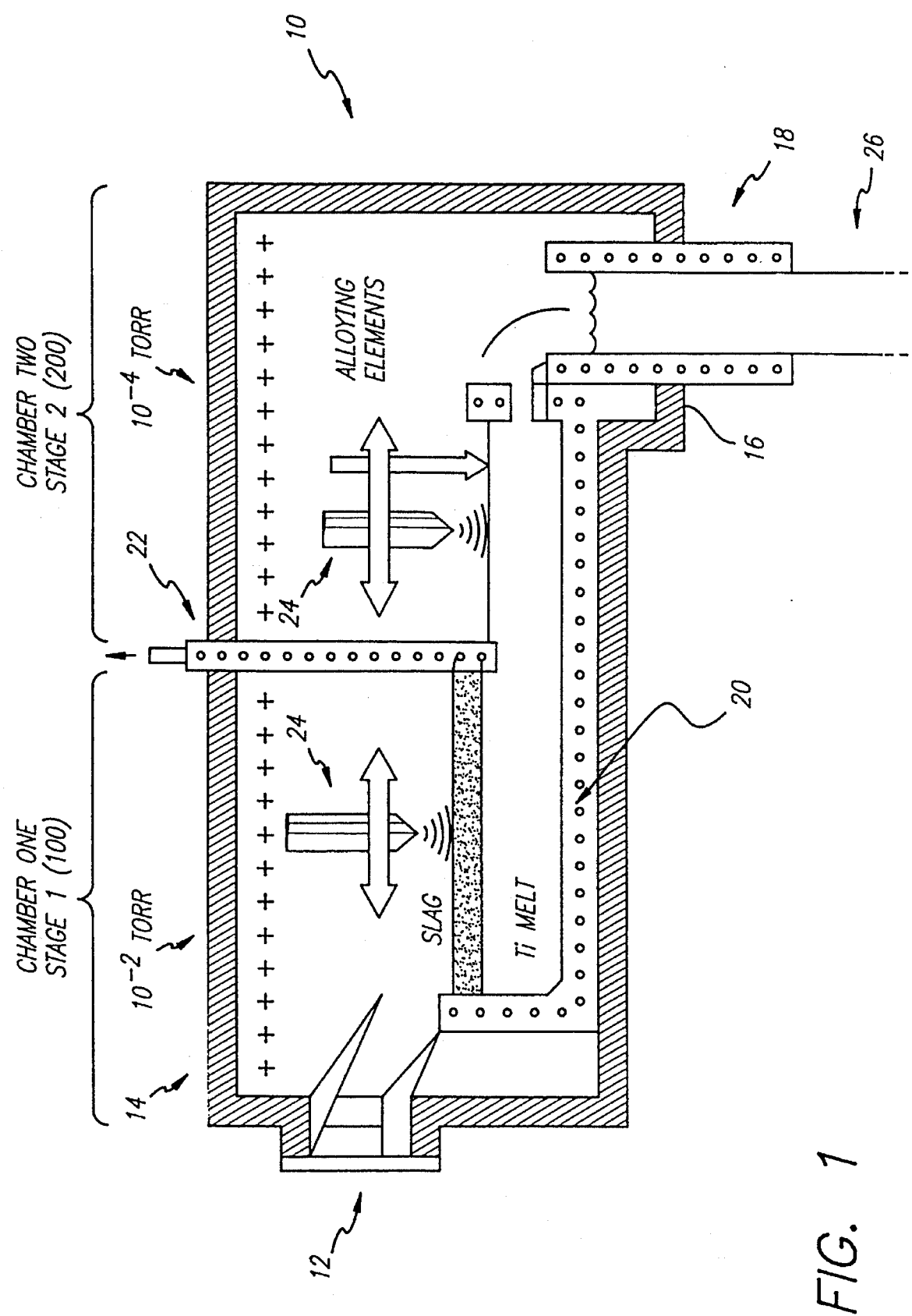
FIG. 1 is a diagrammatic sectional view of a furnace used to accomplish the process herein.

DETAILED DESCRIPTION OF THE INVENTION a) Prior Art Methods

The most popular methods of titanium refining today are the Kroll and Hunter batch processing. These methods involve the following steps.

(1) Initial Ore Processing: The chlorination of titanium ores to produce titanium tetrachloride ($TiCl_4$).

(2) Production of Titanium Sponge: The spraying of the $TiCl_4$ into molten magnesium at about 1100° C. in a vacuum retort. Metallic sodium or calcium may be used instead of magnesium.

(3) Purification: The leaching and distillation or vacuum remelting of the Ti sponge to remove chlorine, sodium, magnesium or other impurities to produce Ti ingots.

(4) Alloying: The remelting of the Ti ingots to mix the Ti with the desired alloys to produce alloy ingots.

In order to produce titanium dioxide, a white powder used as pigment mainly in the paper and paint industries, after a step similar to step one above, produces the $TiCl_4$ (in liquid form). The resulting liquid is treated as follows.

(i) Oxidation: The $TiCl_4$ is atomized in jet sprays and burned, producing the $TiO_2$ and other oxides.

(ii) Purification: Ferrous and other oxides and impurities are separated from the $TiO_2$. At this stage, some hydrochloric acid is recovered for recycling.

The removal of impurities is critical to the quality, strength and ductility of the final product.

b) The Present Invention

The present invention comprises a low cost semi-continuous process for the production of titanium sponge, titanium alloys or titanium powder suitable for titanium metal processing. Two steps are involved if $TiO_2$ powder is desired and three steps if pure titanium or titanium alloy is desired. These steps are as follows (1) Step One—Production of Titanim Slag. Titanium ore is mixed in an open pit with an exothermic compound bath to reduce the ore to $TiO_2$ and Fe. The Fe will settle to the bottom of the pit and a metal slag containing about 90% $TiO_2$ results. The molten slag is then transported through a pre-heated vacuum charging system into a copper hearth vacuum furnace.

(2) Step Two—Vacuum Processing. The slag is remelted with an electron beam or plasma in a vacuum chamber inside the vacuum furnace. In this chamber, at a vacuum of 0.01 Torr, the balance of the impurities are removed. Carbon and silicon are removed by the oxidation of CO or $SiO_2$. Slag containing less volatile elements are skimmed or reacted with the base melt to form volatile sub-oxides. At the bottom of the furnace there is a molten mass in which some traces of Fe flow to the lowest level, the $TiO_2$ (in liquid form) floats over them, and the impurities in the form of liquid slag stay on top and are continuously removed. The liquid $TiO_2$ is separated and cooled to produce the powder used as pigment.

If the foregoing two step process is to produce 99.7% pure titanium or a titanium alloy in metallic form, a further Step Three is added.

Step Three—Refining and Alloying the Liquid. TiO is fed into a second stage of the vacuum chamber, at a vacuum pressure of 0.0001 Torr, and heated with a second electron beam or plasma which separates the oxide into pure titanium and a free $O_2$.

If titanium alloys are desired, the alloy material is injected into the liquid titanium. This mass is then discharged into a continuous cast cold drawn ingot which is removed from the furnace.

The process just described in Steps Two and Three may be accomplished in a device as shown in FIG. 1. There, a two-stage furnace or furnace vacuum chamber (10) with a charging port or mouth (12) at its leftmost end and an outlet or opening (16) in the base of its rightmost end is shown. Along the interior ceiling of the furnace are condensation grids (14). Extending part way from the interior ceiling to the base of the furnace vacuum chamber (10) interior is water cooled skimmer (22). The floor of the interior of furnace vacuum chamber (10) is covered by water cooled copper hearth (20) and extending out of opening (16) is cooling jacket (18). Water cooled skimmer (22) acts to divide furnace vacuum chamber (10) into a first stage, first chamber (100) and a second stage, second chamber (200) which represent areas of differing vacuum pressure. An electron beam gun (24) is shown in both chambers (100, 200). In the first stage, first chamber (100), gun (24) is horizontally mobile and in the second stage, second chamber (200), it is horizontally and vertically mobile. These guns (24) are suspended in known fashion from the ceiling of the furnace vacuum chamber (10). The manner of constructing a device such as shown in FIG. 1 will be evident to those skilled in the art and therefore preferred materials, connections, wall thickness and the like are not specified.

(1) In the first step of this process as noted above, ore is subjected to a thermic reaction or reduction in a preheated aluminum/magnesium bath to reduce the ore to a metal containing about 90% titanium. The resultant slag contains aluminum oxide, calcium aluminate and other aluminum compounds. The molten titanium, aluminum, magnesium, slag mixture is then transported immediately through a preheated vacuum charging system into the two stage electron beam cold copper hearth vacuum furnace (10) as seen in FIG. 1. Thus begins the second step.

(2) The partially reduced metal is now remelted in the two stage electron beam cold copper hearth vacuum furnace (10). The first stage begins in first chamber (100) which is in the left most half of the furnace (10) near the mouth (12). In this area, a vacuum pressure of between 10 to $10^{-4}$ Torr and preferably $10^{-2}$ Torr is present. However any pressure heat combination which removes the Al, Fe and other high vapor pressure impurities by volatization from the slag is satisfactory. Through the presence of the electron beam from electron beam gun (24), the vacuum, carbon and silicon are removed by oxidation to CO or $SiO_2$. In FIG. 1, the electron beam gun (24) is shown to be a 50 KW device. However, that power may be varied as long as the pressure heat combination results in the above-described oxidation. The slag containing the less volatile elements is skimmed or reacted with the base melt to form volatile suboxides.

(3) In the first stage, first chamber (100) of the cold hearth furnace (10), the partially refined material is in the liquid state. Because of this state, it is able to flow into the second stage, second chamber (200) located in the rightmost half of the furnace (10). Here, its heat level is maintained, increased or it may be reheated with a second electron beam from electron beam gun (24). For electron beam gun (24) in second chamber (200), again, a 50 KW gun is suggested but this power may be varied in view of pressures used. The second stage, second chamber (200) is held at a pressure of between $10^{-2}$ to $10^{-6}$ Torr and preferably $10^{-4}$ Torr. Here the pure titanium is alloyed to form the desired final alloy. It is then discharged into a continuous cast cold drawn ingot (26) which is removed from the furnace (10).

In the furnace (10), the pressure and heat may be varied from what is described as long as the end result is the same, that is that the pure titanium is alloyed to form the desired final alloy which is discharged as a continuous cast cold drawn ingot.

c) Aluminothermic Smelting

Thermic reactions are those in which a metal oxide is reduced to a metal by reaction with another metal having a higher heat of formation for the oxide. Evolution of heat occurs because of the excess heat of formation of the products. Widespread use of aluminum thermic reactions arises from the great chemical affinity for oxygen, whereby most metal oxides are reduced by the aluminum freeing the metal.

In the present proposed titanium smelting process, a thermic reaction is used to partially reduce the titanium oxide to a metal of between 85% to 95% and generally 90% concentration. The basic reaction is MO+R=RO+M where M is the metal, R is the reducing agent, and O is oxygen.

In the standard iron thermite reaction used for insitu welding, the reaction is given by

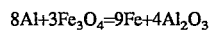

The temperature resulting from the reaction is on the order of 5,000° F. and the reaction is relatively slow and non-explosive. An ignition temperature of 2,100° F. is needed to ignite the reaction. One typical starting procedure is to use magnesium flares or a special starting thermite.

Commercial thermite mixtures used in welding contain alloying elements other than aluminum and iron oxide in the form of a magnetic iron scale. These prepared mixtures often contain alloying elements of pieces of metallic fragments which are melted during the reaction. This is done so that the resulting weld has the proper ductility and strength. Typical strengths of welds through alloying can range from 50 to 100 ksi and ductilities up to over 40%.

Two different welding processes are used. In one, the thermite reaction is used simply to produce the required heat to pressure weld the components. However, the more general procedure is to deposit the molten thermite steel as weld metal. The process is used throughout the industry for the welding of heavy sections of ferrous metals. The purity of the thermite ingredients usually minimizes the formation of grain boundary impurity concentrations present in ordinary cast steels. This in turn produces acceptable ductilities, even though the microstructure resembles that of a casting.

In the aluminothermic-titanium smelting process, the reaction would be the reduction of titaniferous magnetite, known as ilmenite. These ores, named after those discovered in the Ilmen mountains of the Urals, commonly contain about 14% titanium dioxide, 54% iron and 0.6% vanadium pentoxide. The iron is usually separated magnetically, producing a concentrate of about 43% titanium dioxide and 37% iron. The separated material contains 64% iron and 7% titanium dioxide.

In the titanium process, the exothermic heat of reaction of the oxide ore ($TiO_2$) may be insufficient to raise the temperature of the reactants to give molten slag and metal at a sufficiently high temperature to allow for separation of the slag. The process may not be self-supporting since in this case, the reaction is exothermic, but not necessarily autothermic. Conventional techniques of aluminothermic reduction may have limited direct applicability due to the need to add required supplementary heat. There are several methods by which the excess heat can be added to provide a self-sustaining reaction. Three are noted below.

(1) Premelting of a conductive susceptor metal, i.e. molten magnesium, and subsequently adding the mixed reactants to the molten mass. The aluminothermic reaction is replaced by an aluminum magnesium thermic reaction. The rate of addition of the reactants and the power input to the induction furnace are balanced to maintain the temperature of the reacting molten mixture above a predetermined minimum. (c.f. Fletcher U.S. Pat. No. 4,169,722 Oct. 2, 1979).

(2) The use of a plasma or electron beam heating supplement to the aluminumothermic titanium reaction. Here the slag-metal mixture would be post heated to raise the temperature to allow further refining of the metal.

(3) Other methods such as direct heating, or induction heating are available by which the extra heat could be added to the molten reactants to insure the completion of the reaction.

It should be noted that these three modifications to the aluminothermic reaction have the added benefit of allowing the process to be continuous rather than batch.

d) Secondary Refining and Alloying

The second phase of the titanium process can by this invention now consist of introducing the partially refined titanium-slag mixture into a cold hearth vacuum furnace as shown in FIG. 1.

The aluminum-titanium mixture is charged into the furnace vacuum chamber (10) through the mouth (12) using an ultrasonically vibrating feed. The chamber may also be induction heated to reduce the viscosity of the mixture so that sufficient velocity and rate of initial flow can be maintained. Preferably, and as noted above, chamber one (100) where the mixture will first flow is held at $10^{-2}$ Torr. Chamber two (200) is held at a pressure of $10^{-4}$ Torr. The 50 kw electron beam gun (24) in chamber (100) moves about the hearth (20) in a slow sweeping motion heating the mixture in the furnace (10). The outgassing of the molten mixture volatilizes the Fe, Al and other impurities which are collected on the cooled grids (14) mounted above the hearth (20).

Inductive or thermal mixing of the metal should be adequate to ensure adequate heat transfer from the slag to the metal. The water cooled skimmer (22) is designed to draw off a majority of the slag as the molten metal passes thereunder from chamber (100) of a first pressure to chamber (200) of a second higher pressure. Here the second electron beam gun (24) reheats the molten metal and additional purification occurs in chamber (200) as well as the addition of alloying elements if desired. As to this latter point, the manner of addition of such alloys is known in the art and it may be necessary to add mechanical mixers in chamber 200 to prevent the alloying elements from segregating out.

From chamber (200) the output of the high vacuum system discharges the molten titanium metal or alloy into a continuous casting system. A third 50 kw electron beam gun (24) (not shown) is directed at the discharge level at opening (16) to the ingot pour. The ingot (26) is chilled in a water cooled cooling jacket (18) and exits the vacuum system as a continuous 10" diameter ingot. Of course, other diameters if desired, may be provided.

e) Believed Advantages of the Process

The production of elemental titanium is difficult because of the high melting point, the affinity for oxygen, nitrogen, carbon, chlorine, and hydrogen. The believed advantages of the proposed process are as follows.

1. No chlorine is used to produce the titanium sponge. The use of the aluminothermic reaction reduces the likelihood of formation of oxides and carbon which are removed by oxidation to CO by feeding small amounts of base metal oxide into the reaction chamber.

2. The aluminothermic reduction process is a semi-continuous process batch as is currently performed. The secondary refining is semicontinuous and results in a high purity titanium ingot or a high purity alloy ingot. There is no need for multiple pass reheating of the solidified ingot to zone refine the ingot.

3. The pure metal ingot need not be remelted (usually in vacuum) to introduce alloying elements. These elements can be introduced if desired in the second chamber while the refined metal is still molten.

The present invention is claimed as follows.

1. A physical method for refining titanium ore comprising the steps of:

reducing titanium ore to $TiO_2$ and Fe;

subjecting said reduced titanium ore to a single vacuum heat process which causes said $TiO_2$ to separate from said reduced titanium ore; and separating said $TiO_2$ from said reduced titanium ore.

2. The method of claim 1 further comprising the step of subjecting said separated $TiO_2$ to a further vacuum and heat process which frees the $O_2$.

3. A physical method for purifying slag comprised of $TiO_2$, comprising the steps of:

introducing said slag in molten form into one heat vacuum chamber, the heat and vacuum in said chamber being such as to remove impurities by high pressure volatization from said slag;

skimming or otherwise removing impurities from the top f said slag; and removing said $TiO_2$.

4. A physical method for refining slag, said method comprising the steps of:

introducing slag containing $TiO_2$ into a first vacuum heat chamber wherein the vacuum and heat in said chamber causes the removal of impurities from said slag by volatilization;

skimming said slag or reacting said slag with a base melt to form volatile suboxides;

removing $TiO_2$ from said slag.

5. The method of claim 4 further comprising the steps of: passing said $TiO_2$ into a second vacuum heat chamber, said second vacuum heat chamber having a greater vacuum pressure than said first vacuum heat chamber, the vacuum and heat of said second chamber separating out said $O_2$ from said $TiO_2$.

6. The method of claim 5 wherein said vacuum heat chambers are cold hearth furnaces and wherein the heat applied in said chambers is generated through one moving electron beam gun in each chamber.

7. The method of claim 4 further comprising the following steps prior to said introducing step:

mixing titanium ore in an open pit with an exothermic compound bath to reduce the ore to $TiO_2$ and Fe;

allowing the Fe to settle to the bottom of the pit leaving thereabove the metal slag introduced in said introducing step.

8. A physical method for producing $TiO_2$ in a single vacuum heat chamber from slag comprising $TiO_2$ comprising the steps of:

exposing molten slag containing $TiO_2$ in said vacuum heat chamber to between 10 to $10^{-4}$ Torr;

removing impurities from the top of said slag;

collecting at the bottom of said furnace heavier elements of said slag such that between said collecting and said removing remains liquid $TiO_2$ which is removed.

9. The method of claim 8 further comprising the step of: subjecting said liquid $TiO_2$ in a second vacuum heat chamber to a vacuum pressure of $10^{-2}$ to $10^{-6}$ Torr and heat to free the $O_2$ in the liquid $TiO_2$ and separate therefrom pure Ti.

10. The method of claim 9 further comprising the step of injecting into the pure Ti a further material to form an alloy with said Ti.

11. The method of claim 6 further comprising the following steps prior to said exposing step:

mixing titanium ore in an open pit with an exothermic compound bath to reduce the ore to $TiO_2$ and Fe; and allowing the Fe to settle to the bottom of the pit leaving thereabove the metal slag which is then treated to become molten slag, said molten slag being exposed in said exposing step.

* * * * *